US012694566B2

(12) United States Patent
Wang et al.

(10) Patent No.: US 12,694,566 B2
(45) Date of Patent: Jul. 28, 2026

(54) HIGH-PRECISION ODOMETRY ESTIMATION METHOD BASED ON DOUBLE-LAYER FILTERING FRAMEWORK

(71) Applicant: ZHEJIANG UNIVERSITY, Hangzhou (CN)

(72) Inventors: Yue Wang, Hangzhou (CN); Shenhan Jia, Hangzhou (CN); Fuzhang Han, Hangzhou (CN); Rong Xiong, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 309 days.

(21) Appl. No.: 18/646,793

(22) Filed: Apr. 26, 2024

(65) Prior Publication Data

US 2024/0312061 A1 Sep. 19, 2024

Related U.S. Application Data

(63) Continuation of application No. PCT/CN2021/129572, filed on Nov. 9, 2021.

(51) Int. Cl.
*G06T 7/80* (2017.01)
*G01C 22/00* (2006.01)
(Continued)

(52) U.S. Cl.
CPC ............... *G06T 7/80* (2017.01); *G01C 22/00* (2013.01); *G06T 1/0014* (2013.01); *G06T 7/292* (2017.01); *G06T 7/74* (2017.01)

(58) Field of Classification Search
CPC .. G06T 7/80; G06T 7/292; G06T 7/74; G06T 1/0014; G06T 7/579; G06T 7/277;
(Continued)

(56) References Cited

U.S. PATENT DOCUMENTS 7,610,166 B1 * 10/2009 Solinsky .............. A61B 5/4023
73/493
10,399,228 B2 * 9/2019 Shin ..................... G05D 1/0246
(Continued)

FOREIGN PATENT DOCUMENTS

CN 102538781 A 7/2012
CN 110455309 A 11/2019
(Continued)

OTHER PUBLICATIONS

Yang; Yu et al. Moving Horizon Body State Estimation for Quadruped Robot with Multi-Sensor Information Fusion, Sep. 2021, IEEE (Year: IEEE) (Year: IEEE).*
(Continued)

*Primary Examiner* — John Villecco
*Assistant Examiner* — Alejandro Hernandez
(74) *Attorney, Agent, or Firm* — Wiersch Law Group

(57) ABSTRACT

A high-precision odometry estimation method based on a double-layer filtering framework, comprising the following steps: acquiring sensing information of a binocular camera, a main body IMU, a legged auxiliary IMU, a legged joint motor and a foot end force sensor; fusing the rotation angle and rotational velocity of the legged joint motor, and the measurement information of the legged auxiliary IMU and the foot end force sensor by a bottom-layer legged filter to obtain a velocity observation in a legged auxiliary IMU coordinate system; then inputting the velocity observation into an upper-layer filter, and fusing the acquired observation information of the main body IMU and binocular camera by the upper-layer filter to complete information fusion and outputting an odometry estimation result of a robot. The method can provide an effective solution for the autonomous positioning of the quadruped mobile robot in the rapid movement.

10 Claims, 2 Drawing Sheets

(51) Int. Cl.
    *G06T 1/00*         (2006.01)
    *G06T 7/292*      (2017.01)
    *G06T 7/73*       (2017.01)
(58) Field of Classification Search
    CPC . G06T 2207/10021; G06T 7/73; G01C 22/00;
                  G01C 21/1656; G01C 21/10; G01C
                  21/16; G01C 21/00; G06F 17/11
    See application file for complete search history.

(56)            References Cited

U.S. PATENT DOCUMENTS

| | | | |
|---|---|---|---|
| 11,069,071 B1 * | 7/2021 | Devitt | G06T 7/11 |
| 12,450,774 B2 * | 10/2025 | Kannapiran | G06T 7/74 |
| 2014/0343460 A1 * | 11/2014 | Evans, III | A61B 5/6829 600/595 |
| 2018/0231385 A1 | 8/2018 | Fourie et al. | |
| 2019/0204084 A1 * | 7/2019 | Song | G06T 7/579 |
| 2019/0333231 A1 * | 10/2019 | Zhu | G01C 11/04 |
| 2019/0381963 A1 * | 12/2019 | Verschut | A61B 5/1114 |
| 2020/0276496 A1 * | 9/2020 | Tugra | A63F 13/211 |
| 2022/0370224 A1 * | 11/2022 | Seifert | A61F 5/0123 |
| 2023/0049084 A1 * | 2/2023 | Rahmouni | G06T 7/80 |
| 2024/0082004 A1 * | 3/2024 | Oddsson | A61F 2/30721 |
| 2024/0386577 A1 * | 11/2024 | Wang | G06T 7/20 |

FOREIGN PATENT DOCUMENTS

| | | | |
|---|---|---|---|
| CN | 111949929 A | | 11/2020 |
| CN | 112254729 A | | 1/2021 |
| CN | 115049910 A | * | 9/2022 |

OTHER PUBLICATIONS

International Search Report (PCT/CN2021/129572); Date of Mailing: Aug. 4, 2022.

\* cited by examiner

HIGH-PRECISION ODOMETRY ESTIMATION METHOD BASED ON DOUBLE-LAYER FILTERING FRAMEWORK

The present application is a continuation of International Application No. PCT/CN2021/129572, filed on Nov. 9, 2021, the content of which is incorporated herein by reference in their entirety.

TECHNICAL FIELD

The present disclosure belongs to the technical field of autonomous positioning of mobile robots, and in particular to a high-precision odometry estimation method based on a double-layer filtering framework.

BACKGROUND

With the rapid development of artificial intelligence, robots, unmanned vehicles, virtual reality, augmented reality and other fields have become research hotspots. Especially when the environment is unknown and GPS signals cannot be used, realizing accurate autonomous positioning and building maps is the research premise in this field.

An inertial measurement unit (IMU) can measure the acceleration and rotational velocity of the mobile platform at a very high frequency, so as to realize relatively high-precision position and attitude estimation in a short period of time. However, the IMU has zero drift and is affected by noises. With the increase of running time, the cumulative error caused by calculating the relative posture by integrating (accumulating) will gradually increase and cannot be corrected. Therefore, other sensors that can sense the external environment are usually used for auxiliary positioning to reduce the influence of IMU noise accumulation and zero drift on the accuracy of odometry estimation. Visual-aided inertial odometry (VIO) corrects the noise and zero drift of the IMU through the camera. Due to its low cost and high robustness, it has become one of the earliest and more common positioning methods successfully applied in aerospace, VR/AR, autonomous driving and other fields. However, in some challenging application scenarios, the VIO algorithm framework also has its limitations: the image frequency is relatively low, and the discretization error and linearization error lead to a significant decline in odometry estimation accuracy or even positioning failure in high dynamic scenes; the image blur in the scene of severe jitter leads to the failure of the conventional feature point matching algorithm; when the mobile platform performs special motions such as plane motion, uniformly accelerated motion or rotation around a fixed axis, the VIO positioning method has serious degradation problems, which leads to the inability to correctly estimate the motion scale. All the above scenes can be found in practical applications, and even some mobile platforms have the above conditions at the same time. For example, when the quadruped mobile robot runs fast, the robot body shakes violently and moves quickly (the fastest quadruped mobile robot can reach 4 m/s at present). Fortunately, these problems can be solved by fusing other sensors on the platform and by multi-sensor fusion.

In recent years, the problem of localization has become a hot research topic in the field of mobile robots, largely due to the invention and application of many new sensors, such as laser radar, cameras and other sensors, which have contributed to the vigorous development of laser SLAM and visual SLAM. Multi-sensor fusion is one of the main research directions in the field of mobile robot perception.

According to the difference of fusion framework, it can be divided into loose coupling and tight coupling. The loose coupling algorithm processes the measured values of various sensors separately to obtain independent pose estimates, and then fuses the results of multiple pose estimates. The tight coupling frame uses the measured values of various sensors to predict and update a group of attitude variables, and finally obtains an optimal position and attitude estimation that conforms to all sensor observations. The loose coupling method is simple in design, and can easily fuse multiple sensor observations. However, when fusing multiple independent pose estimates, linearization errors will be introduced into the observation noise, which will cause the residual model to no longer obey the approximate Gaussian distribution, resulting in large errors in pose estimates. It is generally believed in the research field that the precision of tight coupling multi-sensor fusion algorithm is obviously higher than that of loose coupling method, but its algorithm design is also more complicated. According to the application platform and application scene, choosing the appropriate sensor combination and designing the corresponding tight coupling algorithm is one of the main problems to be solved in the practical application of robot perceptual positioning algorithm.

According to the back-end fusion algorithm, the visual inertial odometry estimation algorithm can be divided into filtering-based algorithm and optimization-based algorithm. The optimization-based method aims at minimizing the re-projection error of feature point observation, and iteratively optimizes the pose of system entities. It relies on g2o, Ceres and other optimization frameworks, and can obtain more accurate pose estimation. However, iterative optimization requires more computing resources. In practical applications, most mobile robots are systems with scarce computing resources (such as single chip microcomputer and on-board chip based on an ARM architecture), and it is difficult to meet the real-time requirements of pose estimation by using iterative optimization methods. The algorithm based on Multi-state Constrained Kalman filter (MSC-KF) mostly makes Markov assumptions, and only needs a relatively small amount of matrix operations to complete more accurate state estimation, which requires less computing resources and can better meet the needs of practical applications.

At present, the common visual inertial odometry estimation algorithm cannot estimate the position and attitude with high precision in the process of fast movement of the quadruped mobile robot, and the laser-based positioning algorithm is difficult to land in practical application because of its extremely high sensor price. Therefore, how to fully consider the platform characteristics of the quadruped mobile robot and reasonably select additional auxiliary sensors for fusion positioning is an urgent technical problem in the application field.

SUMMARY

The object of the present disclosure is to provide a high-precision odometry estimation method based on a double-layer filtering framework, and the present disclosure realizes high-precision odometry estimation in extremely challenging scenes such as violent shaking, fast moving and the like by combining IMU tight coupling fusion visual features and external sensors such as a legged odometer.

The object of the present disclosure is achieved through the following technical solution: a high-precision odometry estimation method based on a double-layer filtering frame-work, including the following steps:

S1, setting intrinsic parameters of a binocular camera and an IMU, and setting extrinsic parameters between a main body IMU and the binocular camera, extrinsic parameters between a main body IMU and a legged odometer, and extrinsic parameters between a legged auxiliary IMU and a legged joint motor; acquiring feedback information of the legged joint motor, measurement information of a foot end force sensor, measurement information of the main body IMU and the legged auxiliary IMU, and binocular vision observation information;

S2, fusing the information of a rotation angle and a rotational velocity of the legged joint motor, the measurement information of the legged auxiliary IMU and the foot end force sensor acquired in S1 by a bottom-layer legged filter, wherein a state vector of the bottom-layer legged filter is firstly defined, an average velocity observation of the legged auxiliary IMU and a corresponding variance thereof are calculated, then a Kalman gain corresponding to the variance is calculated, and the state vector of the bottom-layer legged filter is updated according to the Kalman gain to obtain a velocity observation in a legged auxiliary IMU coordinate system; and S3, inputting the velocity observation obtained in step S2 into an upper-layer filter, fusing the observation information of the main body IMU, the camera and the legged odometer acquired in S1 by the upper-layer filter, wherein a state vector of the upper-layer filter is firstly defined, the state vector is predicted by a motion model of the main body IMU to obtain a prior of the state vector, and then the prior of the state vector is updated by using binocular vision observation to obtain a vision-main body IMU fusion state estimated value; finally, a state of the vision-main body IMU fusion state estimated value is updated by using the velocity observation of a legged odometer to obtain an estimated value of the state vector of the upper-layer filter is obtained, thereby completing information fusion and outputting an odometry estimation result of a robot.

The present disclosure has the following beneficial effects: the high-precision odometry estimation method based on the double-layer filtering framework can efficiently integrate various sensors such as IMU, camera, foot motor feedback, foot end sensor and the like, and effectively solve the problem that the existing method can hardly obtain high-precision pose estimation under the condition that the mobile platform moves rapidly and shakes violently; at the same time, a MSC-KF framework is selected as the main body, and the multiple states are linearly interpolated to realize the time alignment of multiple sensors; by considering both the fusion accuracy and algorithm efficiency, the real-time relative pose estimation can be carried out on the onboard platform with limited computing resources.

DESCRIPTION OF EMBODIMENTS

The present disclosure will be described in detail with reference to examples and drawings. The inventive principle of the high-precision odometry estimation method based on the double-layer filtering framework is as follows:

A Multi-state Constrained Kalman filter (MSC-KF) algorithm is used to fuse the observation data of an IMU, a legged odometer and a binocular camera to obtain the high-precision pose estimation of the mobile platform, which is a method to fuse the observations of various sensors to realize the high-precision pose estimation. Among them, the relative pose of IMU measurement data obtained by numerical integration (first approximation) is used as a prediction, the camera observation corrects the state by the update strategy of Multi-state Constrained Kalman Filter algorithm, and the legged odometer further corrects updates the state again by the update strategy of an Extended Kalman Filter (EKF) algorithm. The overall framework of the system is consistent with the framework of the MSC-KF algorithm, that is, the camera pose in the past period of time is stored in the state vector in the form of a dynamic window, so as to form an image feature constraint to update the state. The frequency of observation data of the legged odometer is often high, and updating the state with the observation frequency of the legged odometer will obviously increase the time needed for state estimation, therefore the present disclosure updates the adjacent states in the dynamic window by linear interpolation. The MSC-KF filtering framework is used as the main body, and the state in the dynamic window is linearly interpolated to assist the update. This combined framework can effectively improve the operation efficiency of the fusion algorithm and ensure the real-time performance of the algorithm.

Example 1

Figure 1:
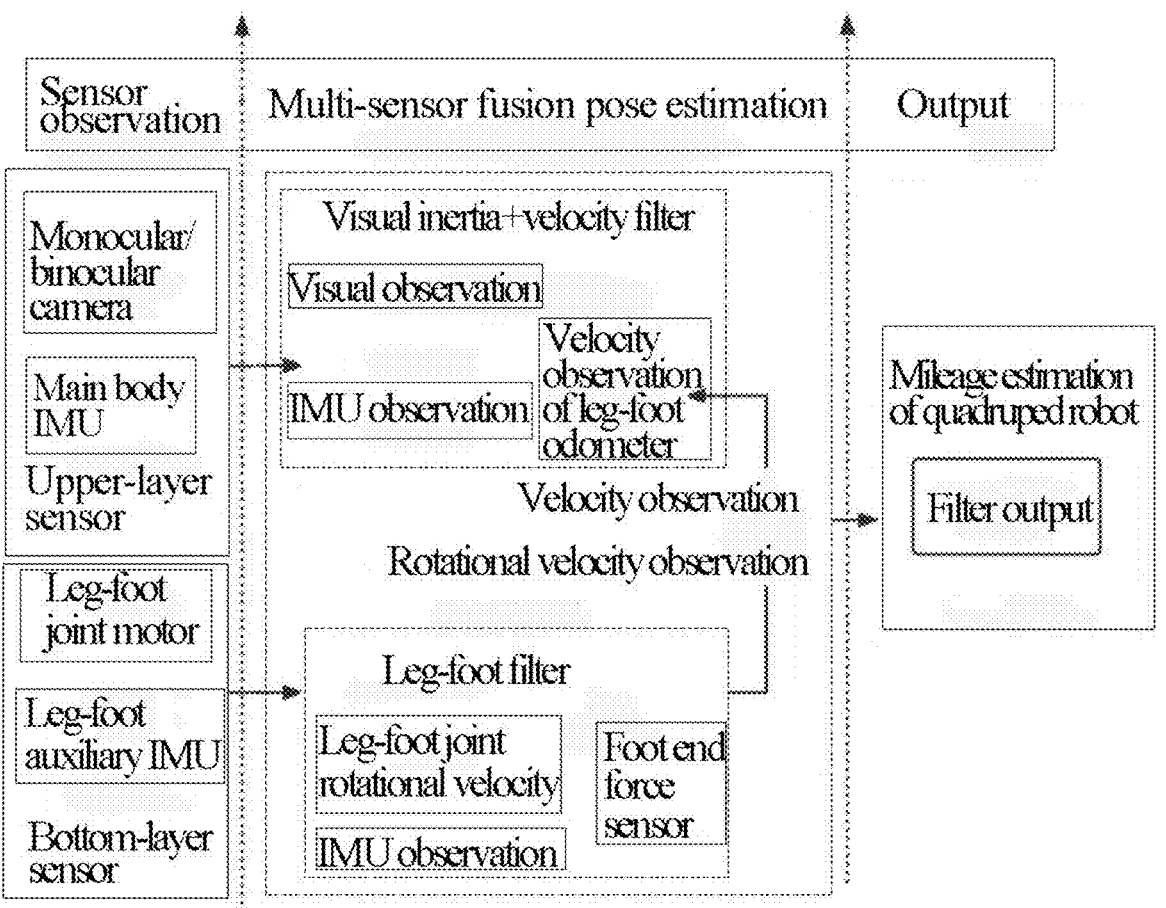
FIG. 1 is a schematic diagram of a two-layer filtering fusion framework according to the present disclosure.
Figure 2:
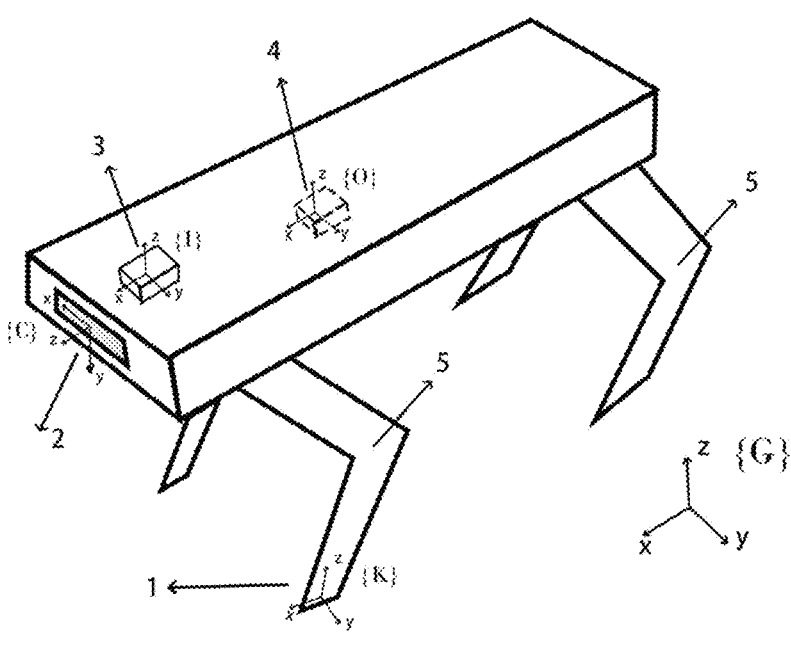
FIG. 2 is a schematic diagram of sensor distribution applied to the sensing system of a quadruped mobile robot.

This example provides a high-precision odometry estimation method based on a double-layer filtering framework. FIG. 1 is a schematic diagram of a double-layer filtering fusion framework of the present disclosure; FIG. 2 is a schematic diagram of sensor distribution applied to the sensing system of a quadruped mobile robot, which mainly includes the following steps:

S1, a binocular vision inertial odometry estimation system is constructed, intrinsic parameters of the binocular camera and the IMU and extrinsic parameters among the binocular camera, the IMU and the legged odometer are input, and the information of the rotational velocity and rotation angle feedback of the binocular camera, the IMU, the legged auxiliary IMU, the legged joint motor and the foot end force sensor is acquired.

The construction mode of the sensing system of a a quadruped robot is as follows: FIG. 2 is a schematic diagram of sensor distribution of the quadruped robot sensing system. As shown in FIG. 2, the sensing system entity of the quadruped robot includes a foot end force sensor 1, a binocular camera 2, a main body IMU3, a legged auxiliary IMU4, and a legged joint motor 5. The binocular camera 2 is fixedly arranged on the head of the quadruped robot; the main body IMU3 is installed on the head of the quadruped robot; the legged auxiliary IMU4 is installed in the body center of the quadruped robot; the legged joint motor 5 is installed on the second movable joint of each leg of the robot, and can feed back the rotation angle and rotational velocity information of the joint; the foot end force sensors 1 are respectively installed at the ends of four legs of the robot.

Description of internal and extrinsic parameters: the intrinsic parameters of the IMU include the variance of accelerometer measurement noise, the variance of accelerometer random walk noise, the variance of gyroscope measurement noise and the variance of gyroscope random walk noise. The intrinsic parameters of the binocular camera include the focal coordinates, focal length and distortion parameters of the camera. The extrinsic parameters required by the double-layer filtering fusion algorithm include the extrinsic parameters between the main body IMU and the binocular camera, the extrinsic parameters between the main body IMU and the legged odometer, and the extrinsic parameters between the legged auxiliary IMU and the legged joints. The extrinsic parameters between the main body IMU and the binocular camera include the rotation matrix from the IMU coordinate system to the camera coordinate system and the position of the camera coordinate system in the main body IMU coordinate system. The extrinsic parameters between the main body IMU and the legged odometer include the rotation matrix from the main body IMU coordinate system to the legged odometer coordinate system and the position of the legged odometer coordinate system in the main body IMU coordinate system. The extrinsic parameters between the legged auxiliary IMU and the legged joints include the rotation matrix from the legged auxiliary IMU coordinate system to the legged coordinate system and the position of the legged coordinate system in the legged auxiliary IMU coordinate system.

Description of sensor measurement information: the sensor information includes feedback information of the legged joint motor, the measurement information of the foot end force sensor, the measurement information of the main body IMU and legged auxiliary IMU, and binocular vision observation information; the feedback information of the legged joint motor includes motor rotation angle information and rotational velocity information, and the acquisition frequency is 1000 Hz; the measurement information of the foot end force sensor includes the force when the foot end contacts the ground, and the acquisition frequency is 1000 Hz; the measurement information of the main body IMU and the legged auxiliary IMU includes the accelerations along the three axes (x,y,z) of the IMU coordinate system and the rotational velocities around the three axes, and the signal acquisition frequency is 400 Hz; the binocular vision observation information includes a left eye picture and a right eye picture acquired by a binocular camera at the same time.

S2, information fusion is carried out by a bottom-layer legged filter; the core idea of this step is to regard the touch point of the quadruped robot as the movement tip of the manipulator, and under the condition that the motor velocity of each joint is known, the relative position between the touch point of the leg and the robot body can be obtained by solving the forward kinematics by a DH parameter method; the upper-layer filter has two working stages: prediction stage and update stage; in the prediction stage, the upper-layer filter performs first-approximation integration operation on the acceleration and rotational velocity measured by the main body IMU between two adjacent images, and then obtains the movement displacement and rotation angle of the quadruped robot during this period; in the updating stage, the upper-layer filter uses the Multi-state Constrained Kalman Filter fusion method to fuse and update the results of the IMU prediction stage with camera observation, and uses the Extended Kalman Filter fusion method to further fuse and update the odometry estimation results updated by the camera with the velocity observation of the legged odometer, which specifically includes that following sub-steps:

S201, the state vector of the bottom-layer legged filter is defined, and the predicted state vector is obtained by using the observation model of the legged auxiliary IMU, specifically:

the state vector of the bottom-layer legged filter is defined as $$x^T = [\, p \quad R \quad v \quad b^a \quad b^w \,]$$

where, p represents a position of a robot body in a world coordinate system, R represents a rotating attitude of the robot body in the world coordinate system, v represents a velocity of the robot body in the world coordinate system, $b^a$ represents a zero bias error bias of an accelerometer of the legged auxiliary IMU, and $b^w$ represents a zero bias error bias of a gyroscope of the legged auxiliary IMU.

The following is obtained according to the observation model of legged auxiliary IMU:

$$_I\tilde{\omega}_{WI} = {}_I\omega_{WI} + b^w + n_\omega$$

$$_I\tilde{a}_{WI} = {}_I a_{WI} + b^a + n_a$$

where, $_I\tilde{\omega}_{WI}$ superscript represents a measured angular velocity of the legged auxiliary IMU in the IMU coordinate system, $_I\tilde{a}_{WI}$ superscript represents a measured acceleration of the legged auxiliary IMU in the IMU coordinate system, $_I\omega_{WI}$ and $_I a_{WI}$ represent real angular velocity and acceleration of the legged auxiliary IMU in the IMU coordinate system, and $n_\alpha$ and $n_\omega$ are noises of the acceleration and a rotational velocity observation, all of which adopt a zero-mean Gaussian white noise model.

The observation of the legged auxiliary IMU is transformed into the body coordinate system as a control input $u_k$ of the system, and a corresponding input at $t_k$ is obtained:

$$u_k = \begin{bmatrix} \omega_k \\ a_k \end{bmatrix} = \begin{bmatrix} R_{IB}(_I\tilde{\omega}_{WI} - (b^w + n_\omega)) \\ R_{IB}(_I\tilde{a}_{WI} - (b^a + n_a)) \end{bmatrix}$$

where, $R_{IB}$ is a corresponding rotation transformation from the legged auxiliary IMU coordinate system to the body coordinate system, $\omega_k$ is an angular velocity in the corresponding body coordinate system at a time $t_k$, and $\alpha_k$ is the acceleration in the corresponding body coordinate system at the time $t_{k-1}$.

The following prediction relationship is obtained according to an IMU motion model:

$$x_{\bar{k}} = \begin{bmatrix} p_{k-1} \\ v_{k-1} \\ 0 \\ b^a_{k-1} \\ b^a_{k-1} \end{bmatrix} + \begin{bmatrix} v_{k-1}\Delta t \\ (-\tilde{\omega}_k v_{k-1} + (R_{k-1})^T g + a_k)\Delta t \\ R_{k-1}\exp(\tilde{\omega}_k \Delta t) \\ 0 \\ 0 \end{bmatrix}$$

wherein, $$x_k^-$$

represents a state vector predicted at a time t, and subscripts k-1 and k respectively represent corresponding variables at $t_{k-1}$ and $t_k$, $$\Delta t = t_k - t_{k-1}, \hat{\omega}_k^{\wedge}$$

represents converting the angular velocity vector in the body coordinate system at the time $t_k$ into a skew symmetric matrix, $R_{k-1}$ represents the rotating attitude of the robot body in the world coordinate system at the time $t_{k-1}$, and exp(·) represents an exponential mapping operation; g is acceleration of gravity.

S202, the velocity of the touch point of a single leg $\ell$ in relation to the body coordinate system is calculated; for each leg, a state of contact $$s_k^{\ell} \in \{0, 1\}$$

is defined, where 1 means that the leg $\ell$ touches the ground at a time $t_k$; next, according to the forward kinematics model of the series structure, the interference of noise is considered at the same time, and at the time $t_k$, the velocity of the touch point of the single leg $\ell$ in relation to the body coordinate system is obtained as follows:

$$\tilde{v}_k^{\ell} = -J(\tilde{\theta}_k)\dot{\tilde{\theta}}_k - \omega \times f_k(\tilde{\theta}_k) + \eta^{v}$$

where, $f_k(\cdot)$ and $J(\cdot)$ are a dynamic model of a legged robot and a corresponding Jacobian matrix; $\tilde{\theta}_k$ and $\dot{\tilde{\theta}}_k$ are a joint angle and a rotational velocity of a second joint of a leg and a foot; $\omega$ is a body rotational velocity in a coordinate system of the legged odometer of the robot and is measured by the legged auxiliary IMU; and $\eta^{v}$ indicates a measurement velocity noise, with a value of zero-mean Gaussian white noise and a variance of around $1e^{-3}$.

S203, considering that a plurality of legs touch the ground at the same time, a possibility of each leg touching the ground is taken as a weight corresponding to the obtained velocity by using the velocity of the touch point of the single $\ell$ in relation to the body coordinate system obtained in step S202, a body velocity at a corresponding moment, that is, a weighted average velocity value of a plurality of legs, is calculated, and an average velocity observation is obtained as:

$$\hat{v}_k = \frac{\sum_{l \in C} P_k(s_k^{\ell} = 1 | f_l^k) \tilde{v}_k^l}{\sum_{l \in C} P_k(s_k^{\ell} = 1 | f_l^k)} + \eta^{v}$$

where, $P_k(\cdot)$ is a relationship between a corresponding touchdown force and a touchdown probability (which can be obtained by experimental test fitting), C is a set of all legs, $$f_l^k$$

represents a contact force with the ground when the leg $\ell$ touches the ground at the time $t_k$, which is obtained by the following dynamic model of a serial robot:

$$f_l^k = -\left(J^T(\tilde{\theta}_k)\right)^{-1}\left(\tau_l - h_l\left(\tilde{\theta}_k, \dot{\tilde{\theta}}_{kb}, g\right)\right)$$

where, $h_l(\cdot)$ represents a continuous Newton-Euler formula, $_b g$ represents acceleration of gravity, and $\tau_l$ is a moment of each leg.

S204, a variance corresponding to the average velocity observation in step S203 is calculated, a corresponding Kalman gain is calculated from the variance, and the state vector predicted in step S201 is updated by using the Kalman gain; an updated state vector is obtained; wherein a velocity vector in the updated state vector is the velocity observation required by the upper-layer filter; specifically:

the variance $$P_k^{v}$$

corresponding to the average velocity observation in step S203 is calculated as:

$$P_k^{v} = P_0^{v} + \left[\frac{1}{2}\left(\wedge\left(\sigma_x^2, \sigma_y^2, \sigma_Z^2\right) + I_3 \frac{\Delta f}{a}\right)\right]^2$$

where, $$P_0^{v}$$

is an initial variance at a time 0, $\alpha$ is a normalized coefficient determined by an empirical value, $I_3$ is an identity matrix, $\Delta f$ represents an average difference of the force of each leg per unit time of discontinuity of the force caused by an impact when touching the ground, and $c_k$ is expressed as a total number of legs touching the ground at $t_k$, then:

$$\Delta f = \frac{1}{c_k} \sum \left| f_l^k - f_{l-1}^k \right|$$

$$\wedge\left(\sigma_x^2, \sigma_y^2, \sigma_z^2\right)$$

represents the variance of the velocity corresponding to each leg:

$$\wedge\left(\sigma_x^2, \sigma_y^2, \sigma_z^2\right) = \frac{1}{c_k} \sum \left(\tilde{v}_k - \hat{v}_k^l\right)\left(\tilde{v}_k - \hat{v}_k^l\right)^T$$

the corresponding Kalman gain $K_k$ is obtained as follows by combining the above formulas:

$$K_k = P_k H^T (HP_k H^T + P_k^v)^{-1} \qquad 5$$

where H represents a Jacobian matrix corresponding to velocity observation; because the velocity observation here $z_k = \tilde{v}_k$, the corresponding Jacobian matrix is the selection matrix of the corresponding linear velocity.

Then the corresponding updated state vector $x_k$ is obtained by updating prediction with the measured and previously calculated Kalman gains:

$$x_k = x_{\bar{k}} + K_k(z_k - Hx_{\bar{k}})$$

where $x_k$ contains a body velocity $v_k$ at the corresponding time $t_k$; the velocity vector in the updated state vector is the velocity observation required by the upper-layer filter.

S3, the velocity observation obtained in step S2 is input into an upper-layer filter, the observation information of the main body IMU, the camera and the legged odometer acquired in S1 by the upper-layer filter is fused, wherein a state vector of the upper-layer filter is firstly defined, the state vector is predicted by a motion model of the main body IMU to obtain a prior of the state vector, and then the prior of the state vector is updated by using binocular vision observation to obtain a vision-main body IMU fusion state estimated value; finally, a state of the vision-main body IMU fusion state estimated value is updated by using the velocity observation of a legged odometer to obtain an estimated value of the state vector of the upper-layer filter is obtained, thereby completing information fusion and outputting an odometry estimation result of a robot, specifically:

S301, firstly, the state vector of the upper-layer filter is defined, and the state vector $x_k$ of the upper-layer filter at the time $t_k$ is defined as below:

$$x_k^* = [x_{I,k}^T \ x_{cl,k}^T]^T \qquad 45$$

where, $x_{I, k}$ represents the state vector of the main body IMU at the time $t_k$; $x_{cl,k}$ is a historical state window saved at the time $t_k$, with a specific form of:

$$x_{I,k} [\, {}^{I_k}_G \bar{q}^T \ {}^G p^T_{I_k} \ {}^{I_k} v^T \ b^T_{b,k} \ b^T_{a,k}]^T$$

$$x_{cl,k} = [\, {}^{I_k}_G \bar{q}^T \ {}^G p^T_{I_k} \ {}^G v^T_{I_k} \ \dots \ {}^{I_{k-M+1}}_G \bar{q}^T \ {}^G p^T_{I_{k-M+1}} \ {}^G v^T_{I_{k-M+1}}\,] \qquad 55$$

where, $${}^{I_k}_G \bar{q} \qquad 60$$

represents a rotation quaternion from the world coordinate system to the main body IMU coordinate system at the time $t_k$; ${}^G p_{I_k}$ represents a position of the main body IMU coordinate system in the world coordinate system at the time $t_k$; ${}^{I_k} v$ represents the velocity of the robot in the main body IMU coordinate system at the time $t_k$; $b_{g,k}$ is a bias of a rotation velocity measured by the main body IMU; $b_{\alpha, k}$ is a bias of an acceleration measured by the main body $$IMU; \{ {}^{I_{k-i}}_G \bar{q}, \ {}^G p_{I_{k-i}}, \ {}^G v_{I_{k-i}} \}(i = 0, \dots, M - 1)$$

are a pose and a velocity at a time $t_{k-i}$ cloned and saved in the historical state window.

S302, the state vector of the upper-layer filter is predicted by using the motion model of the main body IMU, and the prior and variance of the state vector of the upper-layer filter are obtained, specifically:

S3021, the rotational velocity and linear acceleration are acquired by the main body IMU, and the observation model of the main body IMU is constructed, the main body IMU includes a triaxial gyroscope and a triaxial accelerometer, wherein in the IMU coordinate system, the observation model of the main body IMU at the time $t_k$ is expressed as:

$$\omega_{m,k} = {}^{I_k}\omega + b_{g,k} + n_{g,k}$$

$$a_{m,k} = {}^{I_k}_G R({}^G a_k + {}^G g) + b_{a,k} + n_{a,k}$$

where, $\omega_{m,k}$ is an angular velocity measured by the IMU at the time $t_k$; $\alpha_{m,k}$ is the representation of the linear acceleration measured by the main body IMU at the time $t_k$ in the world coordinate system; ${}^{I_k}\omega$ is a true value of the angular velocity the main body IMU at the time $t_k$; ${}^G\alpha_k$ is a true value of the linear acceleration of the main body IMU at the time $t_k$; ${}^G g$ is the representation of the acceleration of gravity in the world coordinate system; in this paper, the bias of the acceleration and angular velocity of the IMU is modeled as a random walk model by a classical method, therefore $n_{a,k}$ and $n_{g,k}$ are zero-mean Gaussian white noises.

S3022, the motion model of the main body IMU is constructed:

$${}^I_G \dot{\bar{q}}(t) = \frac{1}{2} \Omega({}^I \omega(t)) \cdot {}^I_G \bar{q}(t), \ {}^G \dot{p}_I(t) = {}^G v_I(t)$$

$${}^G \dot{v}_I(t) = {}^G a_I(t), \ , \dot{b}_g(t) = n_{\omega g}(t) \dot{b}_a(t) = n_{\omega a}(t)$$

where ${}^I\omega = [\omega_1 \ \omega_2 \ \omega_3]^T$ is the angular velocity measured by the main body IMU; ${}^G\alpha_I$ is the linear acceleration measured by the IMU, which is expressed in the world coordinate system; in this paper, the bias of the acceleration and angular velocity of the IMU is modeled as a random walk model by a classical method, therefore $n_{\omega g}$ and $n_{\omega \alpha}$ are both zero-mean Gaussian white noises; finally $$\Omega(\omega) = \begin{bmatrix} -\omega^\wedge & \omega \\ -\omega^T & 0 \end{bmatrix},$$

wherein $\omega^\wedge$ represents an antisymmetric matrix.

S3023, the prior of the state vector is calculated by using the observation model of the main body IMU obtained in step S3021 and the motion model of the main body IMU constructed in step S3022:

assuming that the IMU measurement values in the time interval $[t_k, t_{k+1}]$ are numerically integrated, the pose change of the robot during this time interval can be obtained, and then the prior pose of the state vector of the robot at the time $t_{k+1}$ can be obtained:

$$\hat{x}_I(t_{k+1}) = f(\hat{x}_I(t_k), u_m(t_k : t_{k+1}))$$

where, $u_m(t_k: t_{k+1})$ represents all measured values of the IMU in a time interval $[t_k, t_{k+1}]$, and $\hat{x}_I(t_{k+1})$ and $\hat{x}_I(t_{k+1})$ are state estimated values at $t_k$ and $t_{k+1}$ respectively; a function f( ) performs discrete-time value integration for the measured values of the IMU followed by superposition on a current state vector to obtain a predicted value of the state vector at a next moment.

S3024, the error state vector is defined and the covariance matrix of the state vector is calculated, specifically:

in order to combine the prior of the state vector with visual observation, it is necessary to calculate the covariance matrix of the prior state vector, therefore, at the same time of state prediction, it is also necessary to fuse the covariance matrix of the last moment and the IMU measurement noise, and the error state vector is defined:

$$\tilde{x}_k^* = \begin{bmatrix} {}_G^{I_k}\tilde{\theta}^T & {}^G\tilde{p}^T{}_{I_k} & {}^{I_k}\tilde{v}^T & \tilde{b}_{g,k}^T & \tilde{b}_{a,k}^T & \tilde{x}_{cl}^T \end{bmatrix}^T$$

wherein except the error state vector of an attitude angle $${}_G^{I_k}\tilde{\theta},$$

the error state vectors corresponding to other state vectors x are: $\tilde{x}=x-\hat{x}$, where $\hat{x}$ is an estimated value of the state vector x; the error vector of an attitude is defined by using $$\delta\bar{q} = \bar{q} \otimes \hat{\bar{q}}^{-1} \simeq \begin{bmatrix} \frac{1}{2}\tilde{\theta}^T & 1 \end{bmatrix}^T;$$

the motion model of the main body IMU is linearized at a current state estimated value:

$$\dot{\tilde{x}}(t) = F_c(t) \cdot \tilde{x}(t) + G_c(t) \cdot n(t)$$

where $$n(t) = \begin{bmatrix} n_g^{*T} & n_{\omega g}^T & n_a^{*T} & n_{\omega a}^T \end{bmatrix}^T$$

is a system noise vector, and a covariance matrix thereof is $Q_c = \mathbb{E}[n(t) \cdot n(t)^T]$; $F_c$ is an error state transition matrix; $G_c$ is an input noise matrix; an IMU dynamic model can be transformed from a nonlinear time-invariant model to a linear time-varying model by linearization; $\Phi(t_{k+1}, t_k)$ is defined as a state transition matrix of a linearization model, and is used to propagate the covariance matrix of the state from the time $t_k$ to the time $t_{k+1}$, and $\Phi(t_{k+1}, t_k)$ can be solved by the following formula:

$$\dot{\Phi}(t, t_k) = F_c(t)\Phi(t, t_k)$$

wherein an initial condition of the above formula is: $\Phi(t_k, t_k)=I_{15+6M}$, and M is a number of historical states cloned and saved in the historical state window; a standard EKF framework is used to calculate the covariance matrix of the prior pose:

$$P_{k+1|k} = \Phi(t_{k+1}, t_k)P_{k|k}\Phi^T(t_{k+1}, t_k) + Q_{d,k}$$

where $Q_{d,k}$ is a noise covariance matrix of a discrete-time system:

$$Q_{d,k} = \int_{t_k}^{t_{k+1}} \Phi(t_{k+1}, \tau)G_c(\tau)Q_cG_c^T(\tau)\Phi^T(f_{k+1}, \tau)d\tau.$$

After each state prediction, MSC-KF will clone the pose components in the current state and save them in the historical pose window $x_{cl}$ a for subsequent observation and update.

S303, the prior of the state vector is updated using binocular vision observation to obtain the vision-main body IMU fusion state estimated value, specifically including the following sub-steps:

S3031, a visual observation residual is constructed; a Jacobian matrix of visual observation is derived;

according to an embodiment of the present disclosure, visual observation based on feature points is used; firstly, feature extraction is carried out on an image and feature matching is carried out among multiple frames; the feature points observed by multiple frames of images will be triangulated; finally, the triangulated feature points will be re-projected on the image plane, and the error between the feature points and the actual observation results of each frame is the observation residual.

MSC-KF algorithm will save the poses corresponding to the past M image observations in the state vector $x_{cl,k}$ at the time $t_k$, and save the feature points at the same time. Assuming that the camera observes that the coordinate is $^{c_j}p_f=[x_j\ y_j\ z_j]^T$ at the time $t_j(j=k, k-1, \ldots, k-M+1)$, and the relationship between the three-dimensional coordinate of the coordinate point and its two-dimensional pixel coordinate on the image plane (assuming that the camera has calibrated the internal and extrinsic parameters in advance, this refers to the regularized camera observation), that is, the visual observation model is:

$$z_{n,j} = \frac{1}{z_j}\begin{bmatrix} x_j \\ y_j \end{bmatrix} + n_{z,j}$$

$${}^{c_j}p_f = {}_I^C R_G^{I_j}R\left({}^Gp_f - {}^Gp_{I,j}\right){}^Cp_I$$

where $^{c_j}p_f=[^xj\ ^yj\ ^zj]^T$ is the three-dimensional coordinate of the feature point in the camera coordinate system; $^Gp_f$ is the three-dimensional coordinate of the observed feature point in the world coordinate system, $n_{z,j}$ is zero-mean Gaussian white noise;

$$\{_I^C R, {}^C p_I\}$$

is the rotation matrix and relative position between the camera and IMU, which is calibrated by off-line extrinsic parameters. As shown in the above-mentioned state definition, unlike the traditional EKF-SLAM algorithm, the MSC-KF algorithm does not save the position of the feature point in the world coordinate system in the state, but triangulates the feature point of the common observation of the same feature point by using the historical image in the sliding window to obtain the estimated value $^G\hat{p}_f$ of the feature point position. $^G p_{I,j}$ and $$_G^{I_j} R$$

in the above formula are kept in the historical state $x_{cl,\,k}$ of the sliding window, and $$_I^C R \text{ and } {}^C p_I$$

are extrinsic parameters calibrated in advance, therefore after obtaining $^G\hat{p}_f$ by triangulation, all the variables needed to calculate the observation estimate $\hat{z}_{n,j}$ are obtained. For each feature point, $\hat{z}_{n,j}$ can be calculated by triangulation and observation model, the actual observation of the feature point can be recorded as $$z_{n,j}^m,$$

and the observation residual of the visual feature is $$\tilde{z}_{n,j} = z_{n,j}^m - \hat{z}_{n,j}.$$

As can be seen from the expression, the two-dimensional coordinates of the feature points on the image are nonlinear functions of the state vector and the global coordinates of the feature points, and the observation model can be linearized by taking the estimated value $\hat{x}_{k+1|k}$ of the current state and the estimated value $^G\hat{p}_f$ of the position of the feature points obtained by triangulation as linearization points:

$$\tilde{z}_{n,j} = H_{x,j}\tilde{x}_{k+1|k} + H_{f,j}{}^G\tilde{p}_f + n_{z,j}$$

where $\tilde{z}_{n,j}$ is the observation residual, $H_{x,j}$ and $H_{f,f}$ are the Jacobian matrices of the observation model with respect to the prior value of the state vector and the estimated value of the position feature point. Because this feature point is observed in many states in the history window, there will be many above equations, and the following can be obtained by arranging them into a matrix form:

$$\begin{bmatrix} \tilde{Z}_{n,k+1} \\ \vdots \\ \tilde{Z}_{n,k+m} \end{bmatrix} = \begin{bmatrix} H_{x,k+1} \\ \vdots \\ H_{x,k-m} \end{bmatrix} \tilde{x}_{k+1|k} + \begin{bmatrix} H_{f,k+1} \\ \vdots \\ H_{f,k-m} \end{bmatrix} {}^G\tilde{p}_f + \begin{bmatrix} n_{z,k+1} \\ \vdots \\ n_{z,k-m} \end{bmatrix} \overset{\Delta}{\Longrightarrow} z =$$

$$H_x \tilde{x}_{k+1|k} + H_f{}^G\tilde{p}_f + n_z \overset{N^T H_f = 0}{\Longrightarrow} N^T z = N^T H_x \tilde{x}_{k+1|k} + N^T n_z$$

wherein, in the last step, the left null space mapping is used, and both sides of the equation are multiplied by the left null space of the H f matrix at the same time, thus making full use of visual observation and avoiding adding the position of the feature point to the state vector. By variable replacement, let $\tilde{z}_k = N^T \tilde{z}$, $H_{x,k} = N^T H_x$, $n_{z,k} = N^T n_z$, it can be transformed into the form of $\tilde{z}_k = H_{x,k}\tilde{x}_{k+1|k} + n_{z,k}$, where $\tilde{z}_k$ is the final observation residual and $H_{x,k}$ is the final visual observation Jacobian matrix.

S3032, the prior of the state vector obtained in step S3023, the covariance matrix of the state vector obtained in step S3024, the visual observation residual obtained in step S3031 and the Jacobian matrix of visual observation obtained in step S3032 are fused by using the MSC-KF algorithm to obtain the vision-main body IMU fusion state estimated value.

S304, the state of the vision-main body IMU fusion state estimated value obtained in step S303 is updated using the velocity observation of the legged odometer in step S2 to obtain the estimated value of the state vector, thereby completing the information fusion and outputting the odometry estimation result of the robot.

S3041, a velocity observation model is calculated and a velocity observation residual is constructed; specifically:

assuming that the extrinsic parameter between the legged odometer and the main body IMU is $$\{_I^O q \ {}^I p_o\},$$

then the velocity observation model is:

$$^O v_{m,k} = {}_I^O R {}_G^I R \left( {}^G v_I + {}_G^I R^T \cdot {}^I \omega^\wedge \cdot {}^I p_O \right) + n_v$$

$$^O \omega_{m,k} = {}_I^O R {}^I \omega + n_\omega$$

where, $^O v_{m,k}$ and $^O \omega_{m,k}$ are the body velocity and rotational velocity expressed in the legged odometer coordinate system {O}, $$_I^O R$$

represents the rotation matrix from the main body IMU coordinate system {I}, $^G v_I$ is the velocity expressed by {I} in {G} coordinate system, $$_G^I R$$

is the rotation matrix from the world coordinate system {G} to {I}, $^I\omega$ is the body velocity in the coordinate system {I}, $'\hat{\omega}$ is an anti-diagonal matrix corresponding to the vector $'\omega$, $'P_o$ is the position of $\{O\}$ in $\{I\}$, and $n_v$ and $n_\omega$ are the noises of the velocity and rotational velocity observation, and they all adopt the zero-mean Gaussian white noise model.

In order to update the pose in the state vector by using the velocity observation of the legged odometer, it is necessary to align it with the pose to be updated in the state vector in time. In order to improve the operation efficiency of the EKF algorithm, the present disclosure linearly interpolates the pose sliding window $x_{cl}$ in the state vector, and considering that the rotation matrix in the pose of the robot is on the three-dimensional standard orthogonal manifold, the linear interpolation is also completed on the corresponding manifold. Considering that the velocity observation acquisition time of the legged odometer is $t_k$, and the time stamps corresponding to the two poses adjacent to it in the pose sliding window are $t_{k1}$ and $t_{k2}$ respectively, $t_{k1} < t_k < t_{k2}$, then the linear manifold interpolation for the pose is:

$$\lambda_k = \frac{t_k - t_{k1}}{t_{k2} - t_{k1}}$$

$${}^{I_k}_G R = \mathrm{Exp}\left(\lambda_k \cdot \mathrm{Log}\left({}^{I_{k2}}_G R \cdot {}^{I_{k1}}_G R\right)\right){}^{I_{k1}}_G R$$

$$^{G}v_{I_k} = (1 - \lambda_k)^G v_{I_{k1}} + \lambda_k {}^G v_{I_{k2}}$$

where the timestamps $t_{k1}$ and $t_{k2}$ are the timestamps obtained from the image observation; $\lambda_k$ is a timestamp coefficient; $t_k$ is the observation time stamp of the legged odometer;

$${}^{I_{ki}}_G R (i = 1, 2)$$

is a rotation matrix from the world coordinate system to the IMU coordinate system at the time $t_{ki}(i=1,2)$, and ${}^G v_{I_{ki}}(i=1, 2)$ is the position of the IMU in the world coordinate system at the time $t_{ki}(i=1,2)$. Therefore, after the observation of the legged odometer is obtained at the time $$t_k, \{{}^{I_k}_G R, {}^G v_{I_k}\}$$

can be calculated according to the observation information and the existing information in the state vector, and then the estimated value $^O\hat{v}$ of the velocity $^O v_m$ can be calculated by using the following formula:

$$^O\hat{v} = {}^O_I R {}^{I_k}_G R\left({}^G v_I + {}^{I_k}_G R^T \cdot {}^I\hat{\omega}^\wedge \cdot {}^I p_O\right)$$

where $'\hat{\omega}$ is an antisymmetric matrix of $'\hat{\omega}$, $'\hat{\omega}$ is the estimated value of the angular velocity $'\omega$ in the IMU coordinate system.

$${}^O_I R$$

are the relative pose transformation relationships between the IMU and the legged odometer coordinate system calibrated in advance. From this, the observed residual of the linear velocity of the legged odometer can be obtained $^O\tilde{v} = {}^O v_m - O\hat{v}$, where $^O v_m$ is the actually observed linear velocity of the legged odometer.

The estimated value of the angular velocity can be calculated by IMU observation and the bias in the current state:

$$^O\hat{\omega} = {}^O_I R^I \hat{\omega}$$

where $'\hat{\omega}$ is the estimated value of the angular velocity $'\omega$ in the IMU coordinate system, and $$^O_I R$$

is the relative pose transformation relationship between the IMU and the legged odometer coordinate system calibrated in advance. From this, it can be defined that the observation residual of the rotational velocity of the legged odometer is: $^O\tilde{\omega} = {}^O\omega_m - {}^O\hat{\omega}$, where $^O\omega_m$ is the actually observed rotational velocity of the legged odometer.

According to the fusion updating framework of EKF, in order to update the state vector by the linear velocity and rotational velocity observation of the legged odometer, it is only necessary to linearize the observation model and arrange it into the following form:

$$\tilde{z} = H_x \tilde{x}^* + n$$

where $\tilde{z}$ is an observation residual; $\tilde{x}^*$ is an error state vector; $H_x$ is a Jacobian matrix of the observation model for the state vector; n is observation noise. The observation residual $\tilde{z}$ has been defined and modeled in the first half of this section; the error state vector $\tilde{x}^*$ is defined in the motion model and state prediction part of the IMU; the observation noise n is an externally set parameter.

S3042, the Jacobian matrix of velocity observation is deduced; specifically:

the Jacobian matrix expression of the observation model for the component to be updated in the state vector can be calculated by using a chain derivative rule. The observation vector $\Gamma_k$ of the legged odometer at the time $t_k$ is expressed by the following formula:

$$\Gamma_k = \begin{bmatrix} {}^O v_k \\ {}^O \omega_k \end{bmatrix}$$

then the Jacobian matrix expression for updating the poses at two adjacent times $t_{k1}$ and $t_{k2}$ with $t_k$ is:

$$\frac{\partial \tilde{\Gamma}_k}{\partial \tilde{x}_{k1}} = \frac{\partial \tilde{\Gamma}_k \partial \tilde{x}_k}{\partial \tilde{x}_k \partial \tilde{x}_{k1}}$$

$$\frac{\partial \tilde{\Gamma}_k}{\partial \tilde{x}_{k2}} = \frac{\partial \tilde{\Gamma}_k \partial \tilde{x}_k}{\partial \tilde{x}_k \partial \tilde{x}_{k2}}$$

To calculate the expression $$\frac{\partial \tilde{r}_k}{\partial \tilde{x}_{k_i}}, i = 1, 2,$$

it is necessary to use the legged odometer observation equation to derive all the state quantities in the state vector respectively, and most of the results after derivation are zero vectors. Because the definition of the Jacobian matrix is clear, the specific forms of matrix are not listed here. Only the non-zero terms after derivation are given here:

$$\frac{\partial^o \tilde{v}(t_k)}{\partial_G^{I_k} \tilde{\theta}} = {}^O_I R \left( {}^{I_k}_G R \, {}^G v_{I_k} \right)^{\wedge}$$

$$\frac{\partial^o \tilde{v}(t_k)}{\partial \tilde{b}_{g,k}} = {}^O_I R \cdot {}^I p_O{}^{\wedge}$$

$$\frac{\partial^o \tilde{v}(t_k)}{\partial^G \tilde{v}_{I_k}} = {}^O_I R {}^{I_k}_G R$$

$$\frac{\partial^o \tilde{\omega}(t_k)}{\partial \tilde{b}_{g,k}} = -{}^O_I R$$

where, $${}^O_I R \text{ and } {}^I p_O$$

are the extrinsic parameter between the IMU and legged odometer coordinate system calibrated in advance;

$${}^{I_k}_G R \text{ and } {}^G v_{I_k}$$

are calculated by the linear interpolation algorithm of the aligned part of the timestamp; the antisymmetric matrix corresponding to any vector x is x^. So far, the derivation calculation of $$\frac{\partial \tilde{r}(t_k)}{\partial \tilde{x}_k}$$

has been completed.

Before calculating the $$\frac{\partial \tilde{x}_k}{\partial \tilde{x}_{k1}} \text{ and } \frac{\partial \tilde{x}_k}{\partial \tilde{x}_{k2}},$$

two operation symbols need to be explained. The Lie algebra corresponding to the rotation matrix $R \in \mathcal{SO}(3)$ is denoted as $\omega \in \mathbb{E}(3)$, where $\mathcal{so}(3)$ represents a Lie algebra set corresponding to $\mathcal{SO}(3)$. Therefore, there are equations that are inverse operations for each other:

$$R = \text{Exp}(\omega) = \exp(\omega^{\wedge})$$

$$\omega = \text{Log}(R) = \log(R)^{\vee}$$

wherein, x^ is the anti-symmetric matrix corresponding to any vector x, and $X^{\vee}$ is the inverse operation thereof to obtain the vector corresponding to the anti-symmetric matrix X; exp( ) and log( ) represent a matrix exponential operation and a matrix logarithmic operation respectively.

For $$\frac{\partial \tilde{x}_k}{\partial \tilde{x}_{k1}} \text{ and } \frac{\partial \tilde{x}_k}{\partial \tilde{x}_{k2}},$$

only non-zero items are listed:

$$\frac{\partial_G^{I_k} \tilde{\theta}}{\partial_G^{I_{k1}} \tilde{\theta}} = \text{Exp}\left(\lambda_k \cdot {}_{k1}^{k2}\theta\right) - \lambda_k \cdot J_l\left(\lambda_k \cdot {}_{k1}^{k2}\theta\right) \cdot J_{\gamma}^{-1}\left(\lambda_k \cdot {}_{k1}^{k2}\theta\right)$$

$$\frac{\partial_G^{I_k} \tilde{\theta}}{\partial_G^{I_{k2}} \tilde{\theta}} = \lambda_k \cdot J_l\left(\lambda_k \cdot {}_{k1}^{k2}\theta\right) \cdot J_l^{-1}\left(\lambda_k \cdot {}_{k1}^{k2}\theta\right)$$

$$\frac{\partial^G \tilde{p}_{I_k}}{\partial^G \tilde{p}_{I_{k1}}} = (1 - \lambda_k) \cdot I_3$$

$$\frac{\partial^G \tilde{p}_{I_k}}{\partial^G \tilde{p}_{I_{k2}}} = \lambda_k \cdot I_3$$

where $${}_{k1}^{k2}\theta = \text{Log}\left({}_G^{I_{l2}} R \cdot {}_G^{I_{l2}} R^T\right); I_3$$

is a three-dimensional identity matrix.

At this point, the derivation of non-zero items in Jacobian matrix has been completed. Together with the definition of the error state vector and the definition and derivation of the observation residual, the observation model of the legged odometer can be transformed into the form of $\tilde{z}H_x\tilde{x}^*\times n$, and then be updated by the EKF fusion framework.

S3042, the vision-main body IMU state estimated value and covariance matrix obtained in step S303, the velocity observation residual and the Jacobian matrix of velocity observation obtained in step S3041 are fused by the EKF algorithm to obtain the vision-main body IMU fusion state estimated value.

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

To sum up, the present disclosure effectively overcomes various shortcomings in the prior art and has high industrial utilization value. The high-precision odometry estimation method based on A double-layer filtering framework can efficiently integrate various sensors such as IMU, camera, legged motor feedback, foot end sensor and the like, and effectively solve the problem that the existing method can hardly obtain high-precision pose estimation under the condition that the mobile platform moves rapidly and violently shakes. At the same time, a MSC-KF framework is selected as the main body, and multiple states are linearly interpolated to realize the time alignment of multiple sensors; by considering both the fusion accuracy and algorithm efficiency, the real-time relative pose estimation can be carried out on the onboard platform with limited computing resources.

What is claimed is:

1. A high-precision odometry estimation method based on a double-layer filtering framework, comprising the following steps:

S1, setting intrinsic parameters of a binocular camera and an inertial measurement unit (IMU), extrinsic parameters between a main body IMU and the binocular camera, extrinsic parameters between the main body IMU and a legged odometer, and extrinsic parameters between a legged auxiliary IMU and a legged joint motor; and acquiring feedback information of the legged joint motor, measurement information of a foot end force sensor, measurement information of the main body IMU and the legged auxiliary IMU, and binocular vision observation information;

S2, fusing, by a bottom-layer legged filter, information of a rotation angle and a rotational velocity of the legged joint motor, the measurement information of the legged auxiliary IMU and the foot end force sensor obtained in step S1, comprising:

defining a state vector of the bottom-layer legged filter, calculating an average velocity observation of the legged auxiliary IMU and a variance corresponding to the average velocity observation, calculating a Kalman gain corresponding to the variance, and updating the state vector of the bottom-layer legged filter according to the Kalman gain to obtain a velocity observation in a legged auxiliary IMU coordinate system; and S3, inputting the velocity observation in the legged auxiliary IMU coordinate system obtained in step S2 into an upper-layer filter and fusing, by the upper-layer filter, the observation information of the main body IMU, the camera and the legged odometer acquired in S1, comprising:

defining a state vector of the upper-layer filter, predicting the state vector using a motion model of the main body IMU to obtain a prior of the state vector, updating, by binocular vision observation, the prior of the state vector to obtain a vision-main body IMU fusion state estimated value, and updating, by the velocity observation in the legged auxiliary IMU coordinate system, a state of the vision-main body IMU fusion state estimated value to obtain an estimated value of the state vector of the upper-layer filter and completing information fusion, and outputting an odometry estimation result of a robot.

2. The high-precision odometry estimation method based on the double-layer filtering framework according to claim 1, wherein the step S2 comprises the following sub-steps:

S201, defining the state vector of the bottom-layer legged filter, and obtaining a predicted state vector by an observation model of the legged auxiliary IMU;

S202, calculating a velocity of a touch point of a single leg $\ell$ in relation to a body coordinate system;

S203, setting a possibility of each leg touching the ground as a weight corresponding to the obtained velocity using the velocity of the touch point of the leg $\ell$ in relation to the body coordinate system obtained in step S202, and calculating a body velocity at a corresponding moment, that is, a weighted average velocity value of a plurality of legs, to obtaining the average velocity observation; and S204, calculating the variance corresponding to the average velocity observation obtained in step S203, calculating the Kalman gain corresponding to the average velocity from the variance, and updating the predicted state vector obtained in step S201 using the Kalman gain, to obtain an updated state vector; wherein a velocity vector in the updated state vector is the velocity observation required by the upper-layer filter.

3. The high-precision odometry estimation method based on the double-layer filtering framework according to claim 2, wherein the step S201 further comprises:

defining the state vector of the bottom-layer legged filter as:

$$x^T = \begin{bmatrix} p & R & v & b^a & b^w \end{bmatrix}$$

where p represents a position of a robot body in a world coordinate system, R represents a rotating attitude of the robot body in the world coordinate system, v represents a velocity of the robot body in the world coordinate system, $b^a$ represents a zero bias error bias of an accelerometer of the legged auxiliary IMU, and $b^w$ represents a zero bias error bias of a gyroscope of the legged auxiliary IMU;

obtaining:

$$_I\tilde{\omega}_{WI} = {_I}\omega_{WI} + b^w + n_w$$

$$_I\tilde{a}_{WI} = {_I}a_{WI} + b^a + n_a$$

according to the observation model of legged auxiliary IMU, where $_I\tilde{\omega}_{WI}$ and $_I\tilde{\alpha}_{WI}$ represent a measured angular velocity and a measured acceleration, respectively, of the legged auxiliary IMU in the IMU coordinate system, $_I\omega_{WI}$ and $_I\alpha_{Wi}$ represent a real angular velocity and a real acceleration, respectively, of the legged auxiliary IMU in the IMU coordinate system, and $n_\alpha$ and $n_{106}$ represent noises of the acceleration and a rotational velocity observation, using a zero-mean Gaussian white noise model;

transforming the observation of the legged auxiliary IMU into the body coordinate system as a control input $u_k$, corresponding to a time $t_k$, of the system:

$$u_k = \begin{bmatrix} \omega_k \\ a_k \end{bmatrix} = \begin{bmatrix} R_{IB}({_I}\tilde{\omega}_{WI}-(b^w+n_\omega)) \\ R_{IB}({_I}\tilde{a}_{WI}-(b^a+n_a)) \end{bmatrix}$$

where $R_{IB}$ represents a rotation transformation from the legged auxiliary IMU coordinate system to the body coordinate system corresponding to the legged auxiliary IMU coordinate system, $\omega_k$ represents an angular velocity in the corresponding body coordinate system at the time $t_k$, and $\alpha_k$ represents the acceleration in the corresponding body coordinate system at the time $t_k$;

obtaining:

$$x_k^- = \begin{bmatrix} p_{k-1} \\ v_{k-1} \\ 0 \\ b_{k-1}^a \\ b_{k-1}^g \end{bmatrix} + \begin{bmatrix} v_{k-1}\Delta t \\ (-\tilde{\omega}_k^\wedge v_{k-1} + (R_{k-1})^T g + a_k)\Delta t \\ R_{k-1}\exp(\tilde{\omega}_k^\wedge \Delta t) \\ 0 \\ 0 \end{bmatrix}$$

according to an IMU motion model, where $$x_k^-$$

represents a state vector predicted at a time t, subscripts k−1 and k represent corresponding variables at times $t_{k-1}$ and $t_k$, respectively, $\Delta t = t_k - t_{k-1}$, $$\tilde{\omega}_k^\wedge$$

represents converting an angular velocity vector in the body coordinate system at the time $t_k$ into a skew symmetric matrix, $R_{k-1}$ represents the rotating attitude of the robot body in the world coordinate system at the time $t_{-1}$, exp(·) represents an exponential mapping operation, and g represents acceleration of gravity.

4. The high-precision odometry estimation method based on the double-layer filtering framework according to claim 2, wherein step S202 further comprises:

defining a state of contact $$s_k^\ell \in \{0, 1\}$$

for each leg $\ell$, where 1 means that the leg $\ell$ touches the ground at the time $t_k$;

obtaining the velocity of the touch point of the leg $\ell$ in relation to the body coordinate system at the time $t_k$ as follows:

$$\tilde{v}_k^l = -J(\theta_k)\dot{\theta}_k - \omega \times f_k(\theta_k) + \eta^v$$

where $f_k(\cdot)$ and $J(\cdot)$ represent a legged-robot dynamic model and a Jacobian matrix corresponding to the dynamic model; $\theta_k$ and $\dot{\theta}$ represent a joint angle and a rotational velocity of a second joint of a leg and a foot, respectively; $\omega$ is a body rotational velocity in a coordinate system of the legged odometer of the robot; and $\eta^v$ represents a measurement velocity noise.

5. The high-precision odometry estimation method based on the double-layer filtering framework according to claim 2, wherein step S203 further comprises:

setting the possibility of each leg touching the ground as the weight corresponding to the obtained velocity using the velocity of the touch point of the leg $\ell$ in relation to the body coordinate system obtained in step S202, calculating the velocity of the body at the corresponding moment, that is, the weighted average velocity value of the plurality of legs, and obtaining the average velocity observation as follows:

$$\tilde{v}_k = \frac{\sum_{l \in C} P_k(s_k^\ell = 1 | f_l^k)\tilde{v}_k^l}{\sum_{l \in C} P_k(s_k^\ell = 1 | f_l^k)} + \eta^v$$

where $P_k(\cdot)$ represents a relationship between a touch-down force and a touchdown probability corresponding to the average velocity observation, C represents a set of all legs, $$f_l^k$$

represents a contact force from the ground when the leg $\ell$ touches the ground at the time $t_k$, and is calculated by a serial-robot dynamic model as follows:

$$f_l^k = -(J^T(\theta_k))^{-1}(\tau_l - h_l(\theta_k, \dot{\theta}_k, {_b}g))$$

where $h_l(\cdot)$ represents a continuous Newton-Euler formula, $_b g$ represents acceleration of gravity, and $\tau_l$ is a moment of each leg.

6. The high-precision odometry estimation method based on the double-layer filtering framework according to claim 2, wherein step S204 further comprises:

calculating the variance $$P_k^v$$

corresponding to the average velocity observation in S203 as follows:

$$P_k^v = P_0^v + \left[ \frac{1}{2} \left( \wedge \left( \sigma_x^2, \sigma_y^2, \sigma_z^2 \right) + I_3 \frac{\triangle f}{\alpha} \right) \right]^2$$

where $$P_0^v$$

represents an initial variance at a time 0, $\alpha$ represents a normalized coefficient depending from an empirical value, $I_3$ represents an identity matrix, $\triangle$ f represents an average difference of the force of each leg per unit time of discontinuity of the force caused by an impact when touching the ground, wherein $\triangle f$ is calculated as follows:

$$\triangle f = \frac{1}{c_k} \sum \left| f_l^k - f_{l-1}^k \right|$$

where $c_k$ represents a total number of legs touching the ground at the time $t_k$, wherein $$\wedge \left( \sigma_x^2, \sigma_y^2, \sigma_z^2 \right)$$

represents the variance of a velocity corresponding to each leg, and is calculated as follows:

$$\wedge \left( \sigma_x^2, \sigma_y^2, \sigma_z^2 \right) = \frac{1}{c_k} \sum \left( \tilde{v}_k - \tilde{v}_k^l \right) \left( \tilde{v}_k - \tilde{v}_k^l \right)^T$$

obtaining the Kalman gain $K_k$ corresponding to the velocity corresponding to each leg as follows:

$$K_k = P_k H^T \left( H P_k H^T + P_k^v \right)^{-1}$$

where H represents a Jacobian matrix of a corresponding velocity observation; and obtaining the corresponding updated state vector $x_k$ by updating prediction with the measured and previously calculated Kalman gain $K_k$:

$$x_k = x_k^- + K_k (z_k - H x_k^-)$$

where $x_k$ comprises a corresponding body velocity $v_k$ at the time $t_k$, wherein the velocity vector in the updated state vector is the velocity observation required by the upper-layer filter.

7. The high-precision odometry estimation method based on the double-layer filtering framework according to claim 1, wherein step S3 further comprises the following sub-steps:

S301, defining the state vector of the upper-layer filter;

S302, predicting the state vector of the upper-layer filter using the motion model of the main body IMU to obtain the prior and variance of the state vector of the upper-layer filter;

S303, updating the prior of the state vector of the upper-layer filter according to binocular vision observation, using a Multi-State Constraint Kalman Filter (MSC-KF) algorithm, to obtain the vision-main body IMU fusion state estimated value; and S304, updating the state of the vision-main body IMU fusion state estimated value obtained in step S303, using the velocity observation of the legged odometer in step S2, to obtain the estimated value of the state vector of the upper-layer filter, completing information fusion by using an Extended Kalman Filter algorithm, and outputting the odometry estimation result of the robot.

8. The high-precision odometry estimation method based on the double-layer filtering framework according to claim 7, wherein step S301 further comprises:

defining the state vector of the upper-layer filter at the time $t_k$:

$$x_k^* = \left[ x_{I,k}^T \quad x_{cl,k}^T \right]^T$$

where $x_{I,k}$ represents the state vector of the main body IMU at the time $t_k$; $x_{cl,k}$ represents a historical state window saved at the time $t_k$, wherein $x_{I,k}$ and $x_{cl,k}$ are expressed by:

$$x_{I,k} = \left[ {}_G^{I_k} \bar{q}^T \quad {}^G p_{I_k}^T \quad {}^{I_k} v^T \quad b_{g,k}^T \quad b_{a,k}^T \right]^T$$

$$x_{cl,k} = \left[ {}_G^{I_k} \bar{q}^T \quad {}^G p_{I_k}^T \quad {}^G v_{I_k}^T \quad \cdots \quad {}_G^{I_{k-M+1}} \bar{q}^T \quad {}^G p_{I_{k-M+1}}^T \quad {}^G v_{I_{k-M+1}}^T \right]^T$$

where $$_G^{I_k} \bar{q}$$

represents a rotation quaternion from the world coordinate system to the main body IMU coordinate system at the time $t_k$; ${}^G p_{I_k}$ represents a position of the main body IMU coordinate system in the world coordinate system at the time $t_k$; ${}^{I_k} v$ represents the velocity of the robot in the main body IMU coordinate system at the time $t_k$; $b_{g,k}$ represents a bias value of a rotation velocity measured by the main body IMU; $b_{a,k}$ represents a bias value of an acceleration measured by the main body IMU;

$$\left\{ {}_G^{I_{k-i}} \bar{q}, \quad {}^G p_{I_{k-i}}, \quad {}^G v_{I_{k-i}} \right\} (i = 0, \ldots, M-1)$$

are a pose and a velocity at a time $t_{k-i}$ cloned and saved in the historical state window.

9. The high-precision odometry estimation method based on the double-layer filtering framework according to claim 7, wherein sub-step S302 further comprises the following sub-steps:

S3021, acquiring the rotational velocity and linear acceleration by the main body IMU, and constructing an observation model of the main body IMU, wherein in the IMU coordinate system, the observation model of the main body IMU at the time $t_k$ is expressed as:

$$\omega_{m,k} = {}^{I_k}\omega + b_{g,k} + n_{g,k}$$

$$a_{m,k} = {}^{I_k}_G R\left({}^G a_k + {}^G g\right) + b_{a,k} + n_{a,k}$$

where $\omega_{m,k}$ represents an angular velocity measured by the IMU at the time $t_k$; $\alpha_{m,k}$ represents a linear acceleration measured by the main body IMU at the time $t_k$; ${}^{I_k}\omega$ represents a true value of the angular velocity the main body IMU at the time $t_k$; ${}^G\alpha_k$ represents a true value of the linear acceleration of the main body IMU at the time $t_k$; ${}^G g$ represents the acceleration of gravity; and $n_{a,k}$ and $n_{g,k}$ are zero-mean Gaussian white noises;

S3022, constructing the motion model of the main body IMU:

$$ {}^I_G \dot{\bar{q}}(t) = \frac{1}{2}\Omega\left({}^I\omega(t)\right) \cdot {}^I_G \bar{q}(t), \; {}^G \dot{p}_I(t) = {}^G v_I(t) $$

$$ {}^G \dot{v}_I(t) = {}^G a_I(t), \; , \dot{b}_g(t) = n_{\omega g}(t) \dot{b}_a(t) = n_{\omega a}(t) $$

where ${}^I\omega=[\omega_1 \; \omega_2 \; \omega_3]^T$ represents the angular velocity measured by the main body IMU; ${}^G\alpha_I$ represents the linear acceleration measured by the IMU, wherein $$\Omega(\omega) = \begin{bmatrix} -\omega^\wedge & \omega \\ -\omega^T & 0 \end{bmatrix},$$

where $w^\wedge$ represents an antisymmetric matrix;

S3023, calculating the prior of the state vector using the observation model of the main body IMU obtained in sub-step S3021 and the motion model of the main body IMU constructed in step sub-S3022:

calculating a prior pose of the state vector of the robot at the time $t_{k+1}$:

$$\hat{x}_I(t_{k+1}) = f(\hat{x}_I(t_k), u_m(t_k : t_{k+1}))$$

where $u_m(t_k : t_{k+1})$ represents all measured values of the IMU in a time interval $[t_k, t_{k+1}]$, and $\hat{x}_I(t_k)$ and $\hat{x}_I(t_{k+1})$ are state estimated values at times $t_k$ and $t_{k+1}$ respectively; a function $f( )$performs discrete-time value integration for the measured values of the IMU followed by superposition on a current state vector to obtain a predicted value of a state vector at a next moment; and

S3024, defining an error state vector and calculating a covariance matrix of the state vector, comprising:

defining the error state vector:

$$\tilde{x}_k^* = \left[ \left({}^{I_k}_G \tilde{\theta}^T \; {}^G \tilde{p}^T_{I_k} \; {}^{I_k} \tilde{v}^T \; \tilde{b}^T_{g,k} \; \tilde{b}^T_{a,k} \; \tilde{x}^T_{cl} \right) \right]^T $$

wherein in addition to an error state vector of an attitude angle $${}^{I_k}_G \tilde{\theta}$$

error state vectors corresponding to other state vectors x are: $\tilde{x}=x-\hat{x}$, where $\hat{x}$ represents estimated values of the state vectors x;

defining an error vector of an attitude by $$\delta \bar{q} = \bar{q} \otimes \hat{\bar{q}}^{-1} \approx \left[ \frac{1}{2}\tilde{\theta}^T \; 1 \right]^T;$$

linearizing the motion model of the main body IMU at a current state estimated value as:

$$\dot{\tilde{x}}(t) = F_c(t) \cdot \tilde{x}(t) + G_c(t) \cdot n(t)$$

where $$n(t) = \left[ n_g^{*T} \; n_{\omega g}^T \; n_a^{*T} \; n_{\omega a}^T \right]^T$$

represents a system noise vector, and a covariance matrix thereof is $Q_c = \mathbb{E}[(n(t) \cdot n(t)^T)]$; $F_c$ represents an error state transition matrix; and $G_c$ represents an input noise matrix;

wherein an IMU dynamic model is capable of being transformed from a nonlinear time-invariant model to a linear time-varying model by linearization;

defining $\Phi(t_{k+1}, t_k)$ as a state transition matrix of a linearization model to propagate the covariance matrix of the state from the time $t_k$ to the time $t_{k+1}$, solving $\Phi(t_{k+1}, t_k)$ as follows:

$$\dot{\Phi}(t, t_k) = F_c(t)\Phi(t, t_k)$$

wherein an initial condition of the above formula is: $\Phi(t_k, t_k) = I_{15+6M}$, and M is a number of historical states cloned and saved in the historical state window; and calculating the covariance matrix of the prior pose via a standard Extended Kalman Filter framework:

$$P_{k+1|k} = \Phi(t_{k+1}, t_k)P_{k|k}\Phi^T(t_{k+1}, t_k) + Q_{d,k}$$

where $Q_{d, k}$ represents a noise covariance matrix of a discrete-time system:

$$Q_{d,k} = \int_{t_k}^{t_{k+1}} \Phi(t_{k+1}, \tau)G_c(\tau)Q_c G_c^T(\tau)\Phi^T(t_{k+1}, \tau)d\tau.$$

10. The high-precision odometry estimation method based on a double-layer filtering framework according to claim 9, wherein sub-step S303 further comprises the following sub-steps:

S3031, constructing a visual observation residual, and deriving a Jacobian matrix of visual observation; and S3032, fusing the prior of the state vector obtained in sub-step S3023, the covariance matrix of the state vector obtained in sub-step S3024, the visual observation residual obtained in sub-step S3031 and the Jacobian matrix of the visual observation by using the MSC-KF algorithm, and obtaining the vision-main body IMU fusion state estimated value.

\* \* \* \* \*